United States Patent
Shukla

(10) Patent No.: US 7,385,613 B1
(45) Date of Patent: Jun. 10, 2008

(54) COLLECTING SCRIPTS IN A DISTRIBUTED SCRIPTING ENVIRONMENT

(75) Inventor: Kashmira V. Shukla, Fremont, CA (US)

(73) Assignee: Adobe Systems Incorporated, San Jose, CA (US)

(*) Notice: Subject to any disclaimer, the term of this patent is extended or adjusted under 35 U.S.C. 154(b) by 48 days.

(21) Appl. No.: 10/335,216

(22) Filed: Dec. 31, 2002

(51) Int. Cl.
*G09G 5/00* (2006.01)
*G06T 15/70* (2006.01)

(52) U.S. Cl. ...................................... 345/619; 345/473

(58) Field of Classification Search ............... 345/619, 345/473–475; 707/101, 102, 104.1, 205, 707/206
See application file for complete search history.

(56) References Cited

U.S. PATENT DOCUMENTS

| | | | |
|---|---|---|---|
| 5,751,281 A * | 5/1998 | Hoddie et al. ........... 715/500.1 |
| 5,907,704 A * | 5/1999 | Gudmundson et al. ..... 717/100 |
| 5,937,410 A * | 8/1999 | Shen ....................... 707/103 R |
| 6,175,831 B1 * | 1/2001 | Weinreich et al. ............ 707/10 |
| 6,243,711 B1 * | 6/2001 | Wu et al. ................. 707/104.1 |
| 6,370,537 B1 * | 4/2002 | Gilbert et al. .............. 707/101 |
| 6,549,944 B1 * | 4/2003 | Weinberg et al. ........... 709/224 |

OTHER PUBLICATIONS

Graphics definition found at Wkipedia encyclopedia: http://en.wikipedia.org/wiki/Graphics, May 12, 2006, pp. 1-5.*
Image definition found at Wkipedia encyclopedia: http://en.wikipedia.org/wiki/Graphics, May 12, 2006, pp. 1-2.*
Foley, van Dam, Feiner, and Hughes, Computer Graphics:principles and Practice, Jul. 1997, Addison-Wesly Publishing Company, p. 1.*

* cited by examiner

*Primary Examiner*—Jeffery A Brier
(74) *Attorney, Agent, or Firm*—Fish & Richardson P.C.

(57) ABSTRACT

Methods and apparatus, including computer program products, implement techniques for collecting scripts associated with graphics objects in a hierarchical arrangement of objects. A plurality of scripts are identified by traversing a hierarchical arrangement of graphics objects in a distributed scripting environment. The hierarchical arrangement includes one or more objects having associated scripts. The identified scripts are collected in a data structure.

27 Claims, 11 Drawing Sheets

COLLECTING SCRIPTS IN A DISTRIBUTED SCRIPTING ENVIRONMENT

BACKGROUND

The present invention relates to processing scripts associated with objects in a hierarchical arrangement of objects.

A graphical composition can be represented as a hierarchical arrangement of graphics objects representing elements of the composition. Graphics objects can include objects that represent text, images or graphics in a graphical composition. Graphics objects that represent text can include both dynamic and static text objects. Dynamic text objects include text objects whose contents can change based on user input. Dynamic text objects can be used to implement a form field that accepts user input. Static text objects include text objects whose contents may not be changed based on user input. Static text objects can include text headings and simple typed text. Both static and dynamic text objects, as well as images and graphics, can be animated or decorated in the graphical composition. Objects in a graphical composition can have properties that can be manipulated using commands or methods. Objects with the same properties and behaviors are grouped into classes. An object in a hierarchical arrangement of objects can include other objects. Each object in the hierarchical arrangement can be identified by a unique absolute name that identifies the object by its position in the hierarchical arrangement.

Objects in a graphical composition can be animated by triggering changes in the associated properties and behaviors based on keyframes, events, or states. Keyframes can be used to change the properties or behaviors associated with an object as the object progresses along the timeline. A frame represents a point of time in the timeline for the object. A keyframe is a frame specifying the value for an object property or for an object behavior. Events can be caused by user action or by system-based events. Each object in a graphical composition can also have associated states. States associated with an object can be predefined system states or custom states defined as part of the graphical composition. A change in the state of an object can be triggered by user events, or by interaction with other objects in the graphical composition.

Scripts are instructions that can operate on objects to modify the properties or behaviors of the object. Scripts can be used to control how the objects included in the graphical composition respond to user events. Scripts can also be used to control the interaction of an object in the graphical composition with other objects in the graphical composition. In a hierarchical arrangement of objects, scripts can be associated with individual objects in the hierarchical arrangement. Scripts can also be associated with a triggering condition such that the script is executed when the triggering condition is satisfied.

FIG. 1 illustrates an example of the operation of a script printing tool in a monolithic scripting environment. The monolithic scripting environment includes a hierarchical arrangement of objects, and all the scripts associated with the objects are stored together in a file. As shown, an object_root 100 has an associated script S(_root) 140. The object_root 100 has two children A 105 and E 110, with corresponding associated scripts S(A) 145 and S(E) 150. Object A 105 has three children B 115, C 120, and D 125, each having a corresponding associated script S(B) 155, S(C) 160, and S(D) 165. Object E has a child F 130, and F has a child G 135. The script S(F) 170 is associated with object F130, and the script S(G) 175 is associated with object G 135. In the exemplary scripting environment, the scripts associated with the objects can be stored in a single script file 180. A script printing tool 185 can operate by translating the single script file 180 to an output script file format 190, and printing the scripts in the order in which they appear in the script file 180.

FIG. 2 illustrates an example of a script printing tool operating in a distributed scripting environment. In a distributed scripting environment, the scripts can be generated separately for each object in the hierarchy and scripts can be accessed separately for each object. Unlike the monolithic scripting environment, scripts in a distributed scripting environment typically are not stored together and all the scripts associated with the objects in the hierarchy typically can not be accessed at the same time. Adobe® LiveMotion® software, available from Adobe Systems Incorporated, of San Jose, Calif., is an example of software providing a distributed scripting environment where the scripts can be generated and accessed only for the selected object in the hierarchical arrangement. The example in FIG. 2 includes a hierarchical arrangement of objects that is similar to that in FIG. 1. Scripts associated with the objects can be distributed through the hierarchical arrangement instead of being stored together as in the monolithic scripting environment of FIG. 1. A script printing tool 280 operating in this scripting environment can include a selector 285 to select the script associated with a particular object currently selected by the user. The script for the selected object is communicated to an output file format 290. In this scripting environment the script printing tool is operable to individually print the scripts associated with the selected object to the output file.

SUMMARY OF THE INVENTION

In general, in one aspect, the invention provides methods and apparatus, including computer program products, for collecting the scripts associated with graphics objects in a hierarchical arrangement of objects. The techniques include identifying a plurality of scripts by traversing a hierarchical arrangement of graphics objects in a distributed scripting environment_that includes one or more objects having associated scripts, and collecting the identified scripts in a data structure.

Advantageous implementations of the invention include one or more of the following features. Collecting the scripts can include ordering the scripts within the data structure. The scripts can each have an associated type and ordering the scripts can include grouping the scripts into groups of scripts based on the associated types. The scripts can be triggered by associated triggering conditions, and the type associated with each script can correspond to the triggering condition associated with the script. Ordering the scripts can include arranging the scripts within the groups of scripts based on the objects associated with the scripts. Collecting the scripts can include writing the data structure to a text file or an HTML file. The data structure can include a name identifying the file containing the hierarchical arrangement of objects. Each object in the hierarchical collection of graphics objects can have a unique identifier, and the data structure can include for each script the unique identifier for the object associated with the script. The data structure can include a time stamp associated with the script. In general, in another aspect, the invention provides a data structure tangibly embodied in an information carrier for storing scripts associated with graphics objects in a distributed scripting environment. The data structure includes a file identifier identifying a file containing a hierarchical arrangement of graphics objects. The data structure also includes one or more ordered script sections storing scripts associated with objects in the hierarchical arrangement.

Advantageous implementations of the invention can include one or more of the following features. The scripts can each have an associated type, and each ordered script section can include scripts having the same associated type. Each ordered script section can include scripts ordered based on the object associated with the script.

The invention can be implemented to realize one or more of the following advantages. The dispersed scripts associated with objects in a hierarchical arrangement are collected into a single data structure. The scripts are ordered within the data structure based on the type of script. Scripts of each type are further sorted within the data structure based on the objects associated with the scripts. The data structure used to collect the scripts transforms the object hierarchy into a presentable hierarchy by identifying and classifying the hierarchy. Presenting all the scripts in a single data structure, and sorting the scripts by the type of script and the object, facilitates debugging. The data structure used to collect all the scripts in the hierarchy can also be used as an input to other applications that require the scripts.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
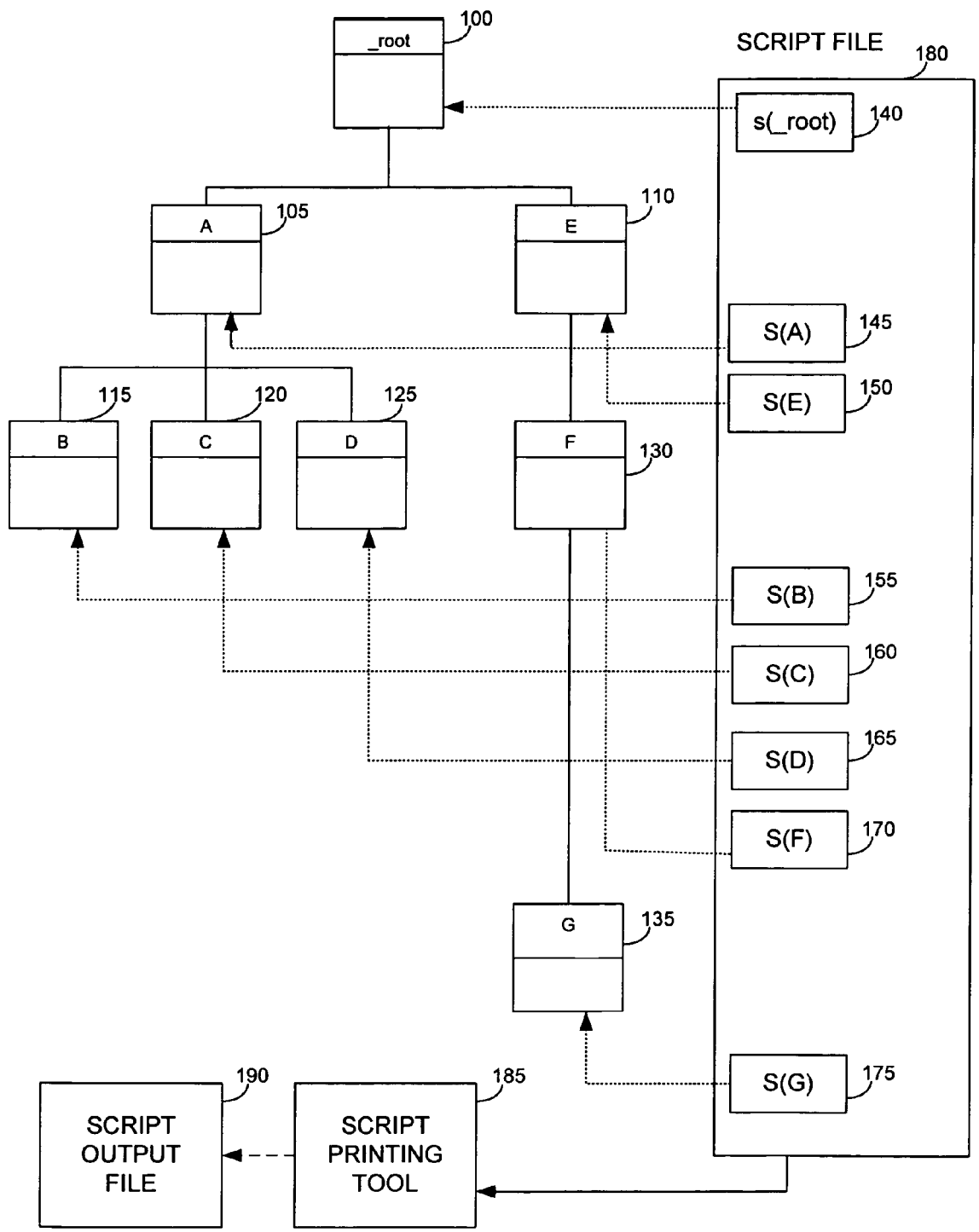
FIG. 1 is a block diagram illustrating the operation of a script printing tool in a monolithic scripting environment.
Figure 2:
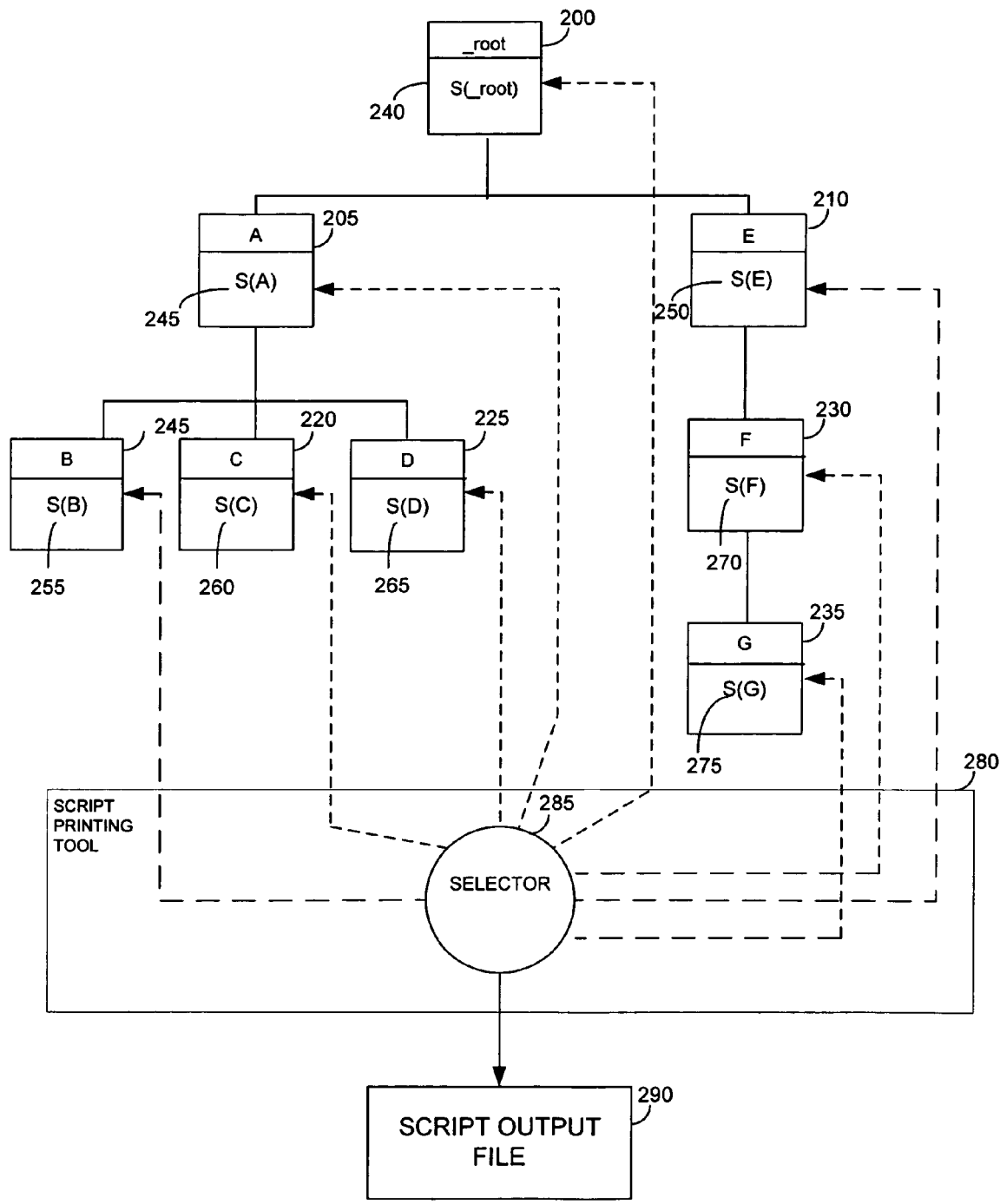
FIG. 2 is a block diagram illustrating the operation of a script printing tool that prints a selected script in a distributed printing environment.
Figure 3:
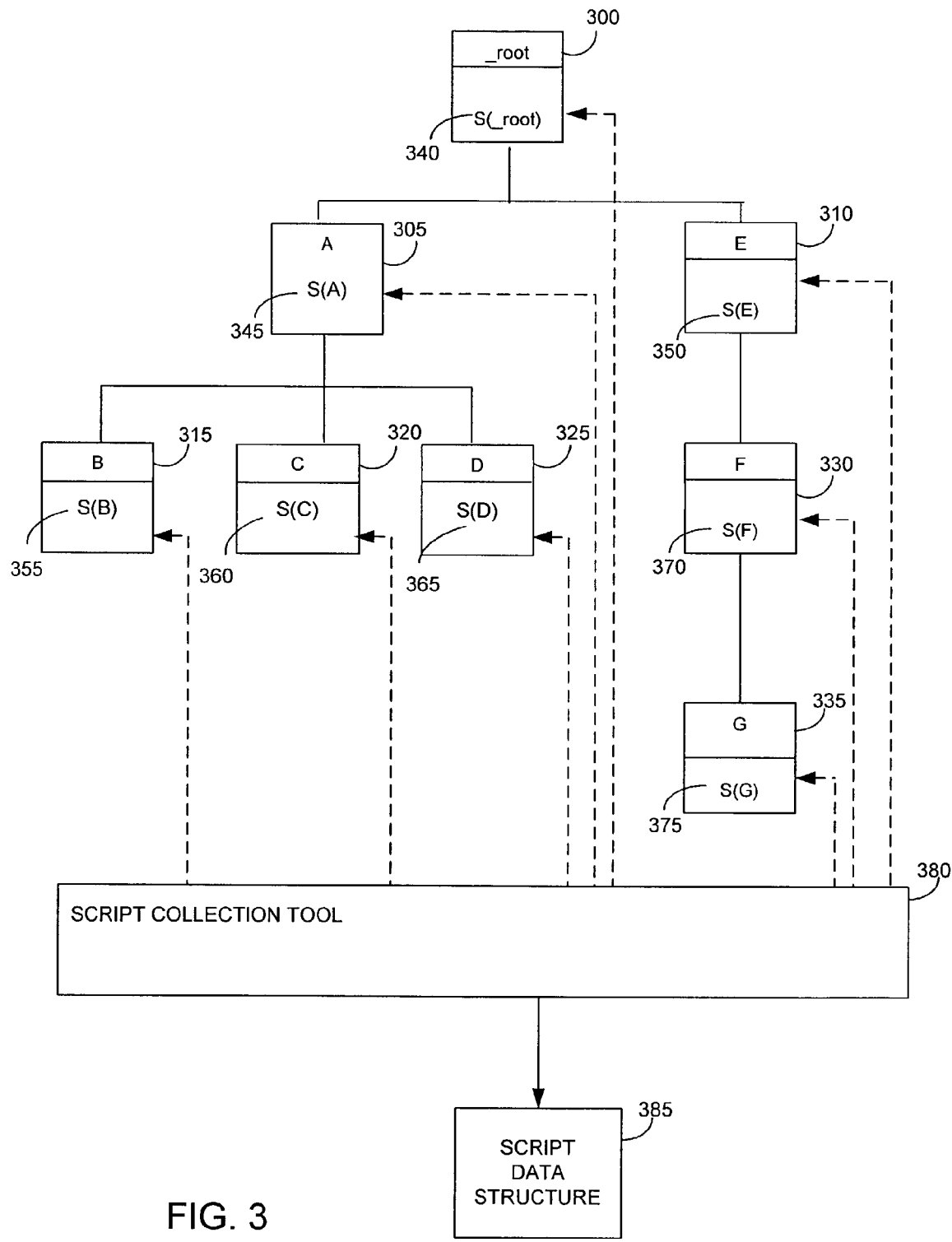
FIG. 3 is a block diagram illustrating the operation of a script printing tool operable to collect scripts in a distributed scripting environment according to one aspect of the invention.

FIG. 3 shows a distributed scripting environment according to one aspect of the invention. The distributed scripting environment includes a hierarchical arrangement of objects. Scripts associated with the objects can be distributed through the hierarchical arrangement, instead of being stored together as in the monolithic scripting environment of FIG. 1. As shown, an object_root 300 has an associated script S(_root) 340. The object_root 300 has two children A 305 and E 310, with corresponding associated scripts S(A) 345 and S(E) 350. Object A 305 has three children B 315, C 320, and D 325, each having a corresponding associated script S(B) 355, S(C) 360, and S(D) 365. Object E has a child F 330, and F has a child G 335. The script S(F) 370 is associated with object F 330, and the script S(G) 375 is associated with object G 335. The scripts associated with the objects in this environment can also be distributed in different files for the individual objects included in the graphical composition. A script collection tool 380 can collect all the scripts associated with the objects in the hierarchical arrangement and store them in a single script data structure 385.

Figure 4:
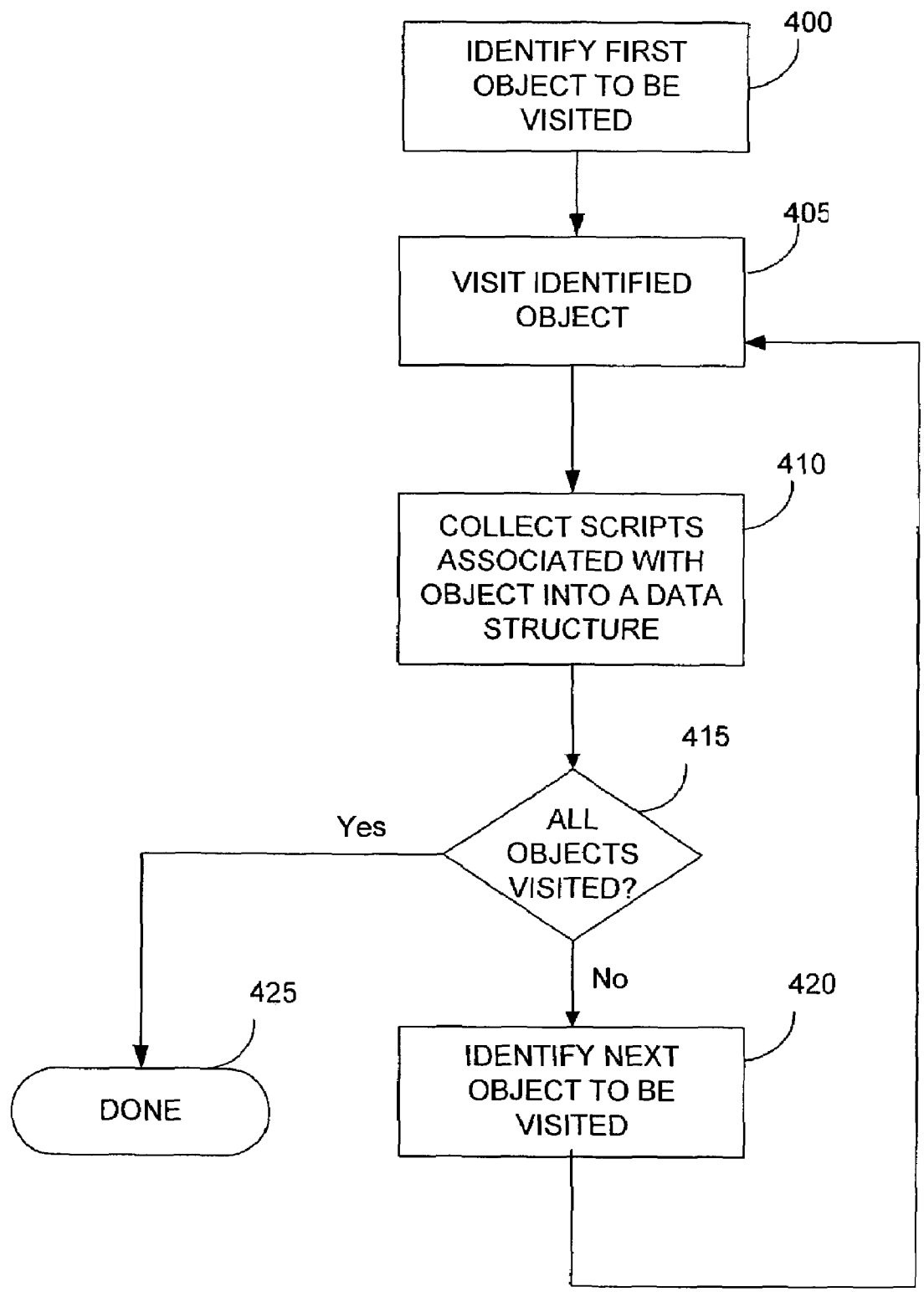
FIG. 4 is a flow diagram illustrating a general method of collecting scripts in a distributed scripting environment according to one aspect of the invention.

FIG. 4 is a flow diagram illustrating a method of collecting scripts in a distributed scripting environment. The method can be performed by the script collection tool 380 (FIG. 3). The script collection tool 380 starts traversing the hierarchical arrangement of objects by identifying a first object to be visited in the hierarchy (step 400), and by visiting the identified object (step 405). All the scripts associated with the object are collected and stored in a data structure (step 410). The script collection tool 380 checks to determine if all the objects in the hierarchical arrangement have been visited (step 415). If all the objects have not been visited, the script collection tool 380 identifies the next object to be visited in the hierarchical arrangement (step 420). Control then passes back to step 405 and the identified object is visited. If all the objects in the hierarchical arrangement have been visited, the collection process ends and all the scripts have been collected (step 425). In one implementation of the disclosed method, visiting the identified object in step 405 includes checking whether there are any scripts associated with the identified object, and the scripts are collected and stored in the data structure only if there are associated scripts for the identified object. In the implementation illustrated in FIG. 4, the script collection tool 380 is configured to collect and organize all scripts for all objects in the object hierarchy. Alternatively, the script collection tool 380 can be configured to provide for user input specifying one or more objects and/or script types, and to collect only scripts for specified objects and/or of specified types.

Figure 5:
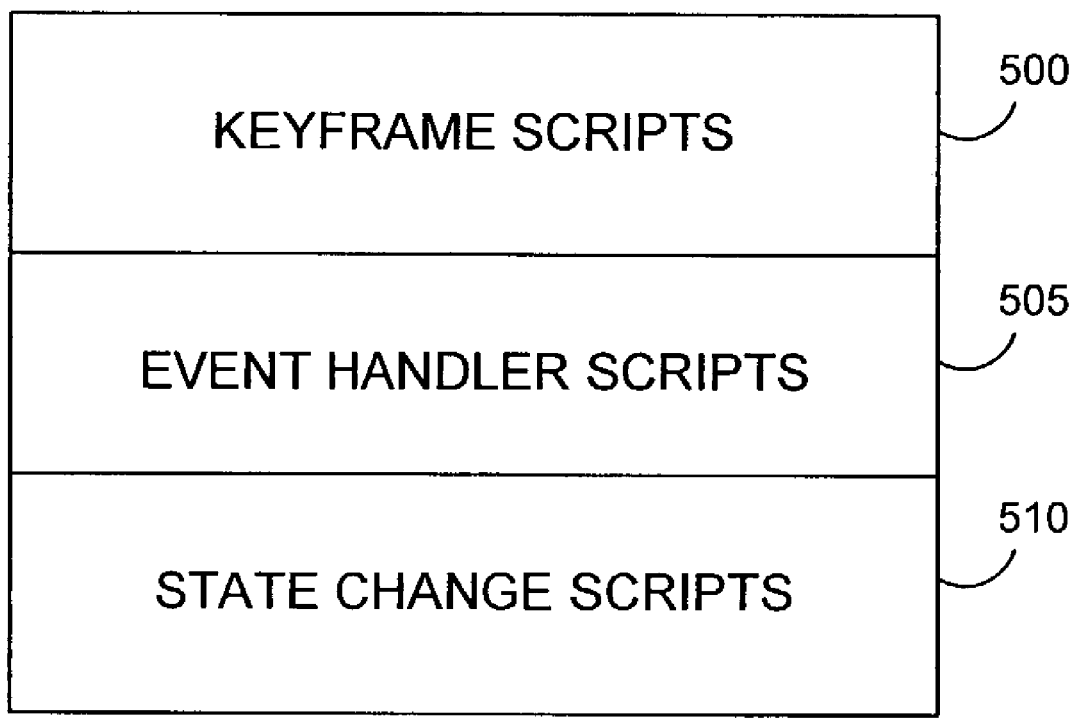
FIG. 5 illustrates a scripting environment that includes three types of scripts.

The scripts associated with an object in the hierarchical arrangement can be grouped into separate types. In one implementation, the type of a script is based on the triggering condition that triggers the execution of the script. Triggering conditions for a script can include, for example, keyframes, states, or events. In alternative implementations, the scripts can be grouped based on the object associated with the script. FIG. 5 shows an example of a scripting environment in which the scripts associated with the objects can be classified into three types—keyframe scripts 500, event handler scripts 505, and state change scripts 510. A keyframe script 500 is associated with a specific frame in a timeline associated with an object. An event handler script 505 is a script that is triggered as a result of a user action or system-based event. A state change script 510 is associated with defined states of an object. The state change script 510 is executed each time the object changes to the state to which the script is added.

Figure 6:
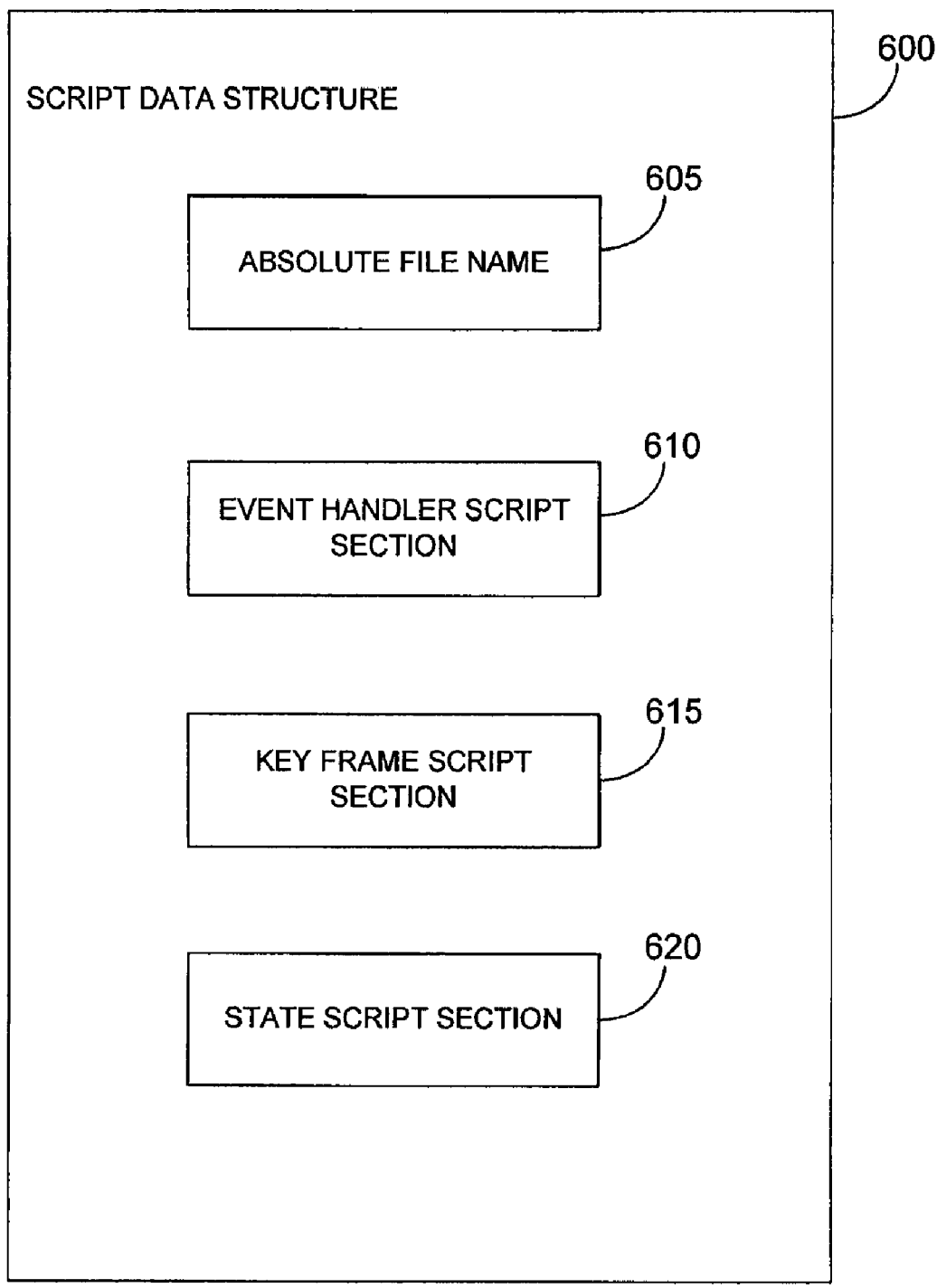
FIG. 6 is a schematic diagram illustrating the organization of one implementation of a script data structure usable by a script collection tool according to one aspect of the invention.

FIG. 6 illustrates one example of the organization of the script data structure 385 (FIG. 3) used by the script collection tool 380 to store scripts associated with individual objects in a hierarchical arrangement. The script data structure can include the absolute file name 605 for the file that contains the hierarchical arrangement of objects. The script data structure can also include separate sections for each type of script that may be associated with the objects. The script collection tool can group the scripts associated with objects based on the type of script, so that a particular type of script is stored in a corresponding section in the script data structure. In one implementation, the script data structure can store event handler scripts in an event handler script section 610 that contains only event handler scripts, keyframe scripts in a keyframe script section 615 that contains only keyframe scripts, and state scripts in a state script section 620 that contains only state scripts.

Figure 7:
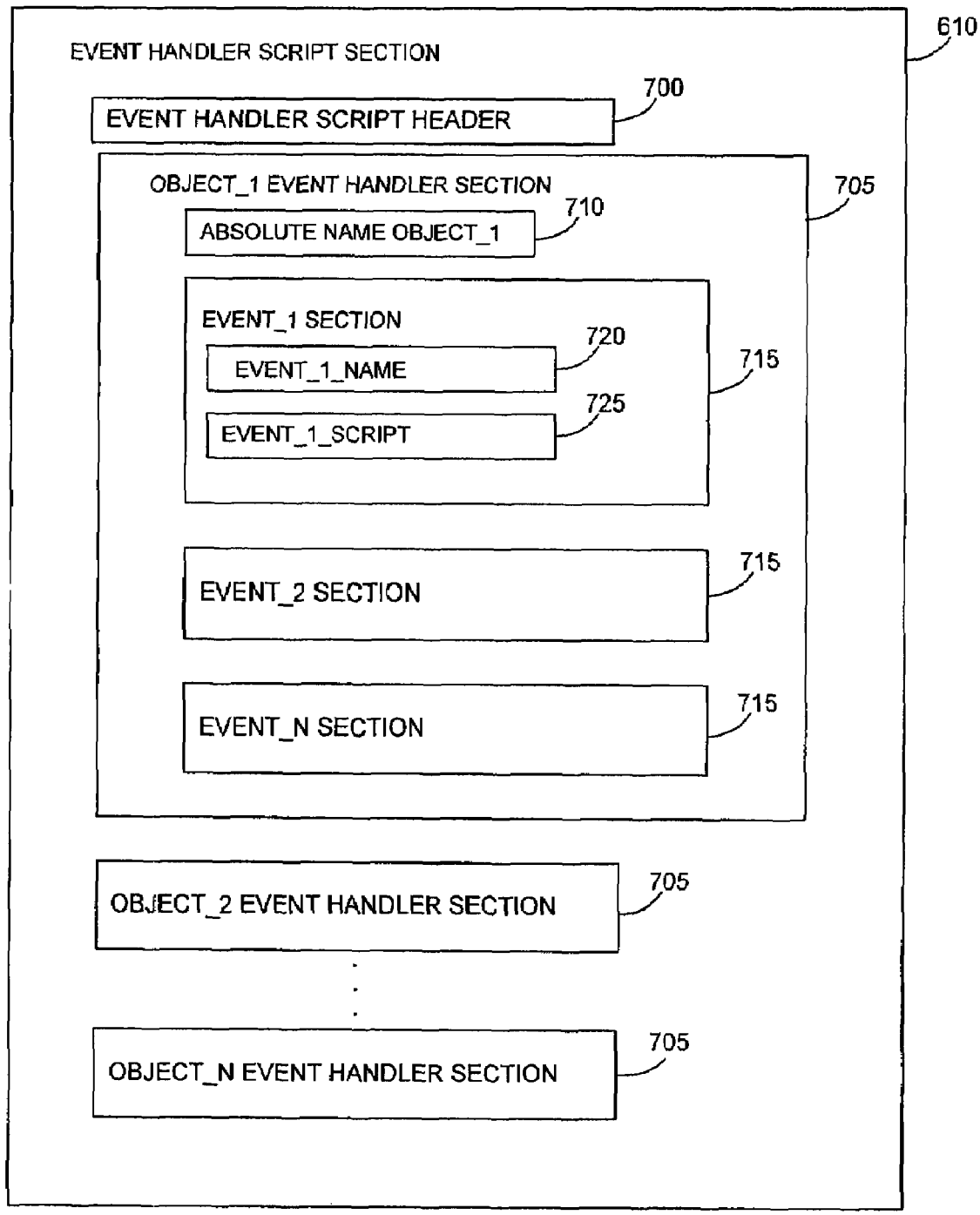
FIG. 7 is an example illustrating the organization of an event handler script section.

Scripts can also be grouped based on the objects associated with the scripts, such that all the scripts associated with an object appear together in the script data structure. In addition, scripts of a particular type can be grouped such that all the scripts associated with a given object appear together in the script data structure 385. FIG. 7 illustrates the organization of an exemplary event handler script section 610 (FIG. 6). As shown, the event handler script section 610 includes an event handler script header 700. The event handler script header 700 can be a text string that identifies the section as an event handler script section. The event handler script section 610 also includes separate object event handler sections 705 for each object in the hierarchy. The object event handler sections 705 include an identifier for the object 710 that is associated with the scripts in that section. The identifier for the object 710 can be a name that uniquely identifies the object in the hierarchy. In one implementation, the name of the object can be the hierarchical path name for the object in the hierarchy. The object event handler sections 705 can also include one or more event sections 715. Each event section 615 for an object can include the name of a triggering event 720 and the script 725 associated with the triggering event. Separate event sections 715 can be used to list different event scripts associated with the same object.

In the exemplary event handler script section illustrated in FIG. 7, the event handler script header 700 is followed by an object event handler section for OBJECT_1 705. The event handler section for OBJECT_1 705 includes an absolute name for OBJECT_1, followed by event sections for each event that triggers the execution of a script. In the example, the event section for EVENT_1 includes an identifier for EVENT_1 720, and the script 725 triggered by the occurrence of EVENT_1. The event section for EVENT_1 is followed by event section for other events associated with OBJECT_1. The object event handler section for OBJECT_1 is followed by object event handler sections for other objects in the hierarchy.

Figure 8:
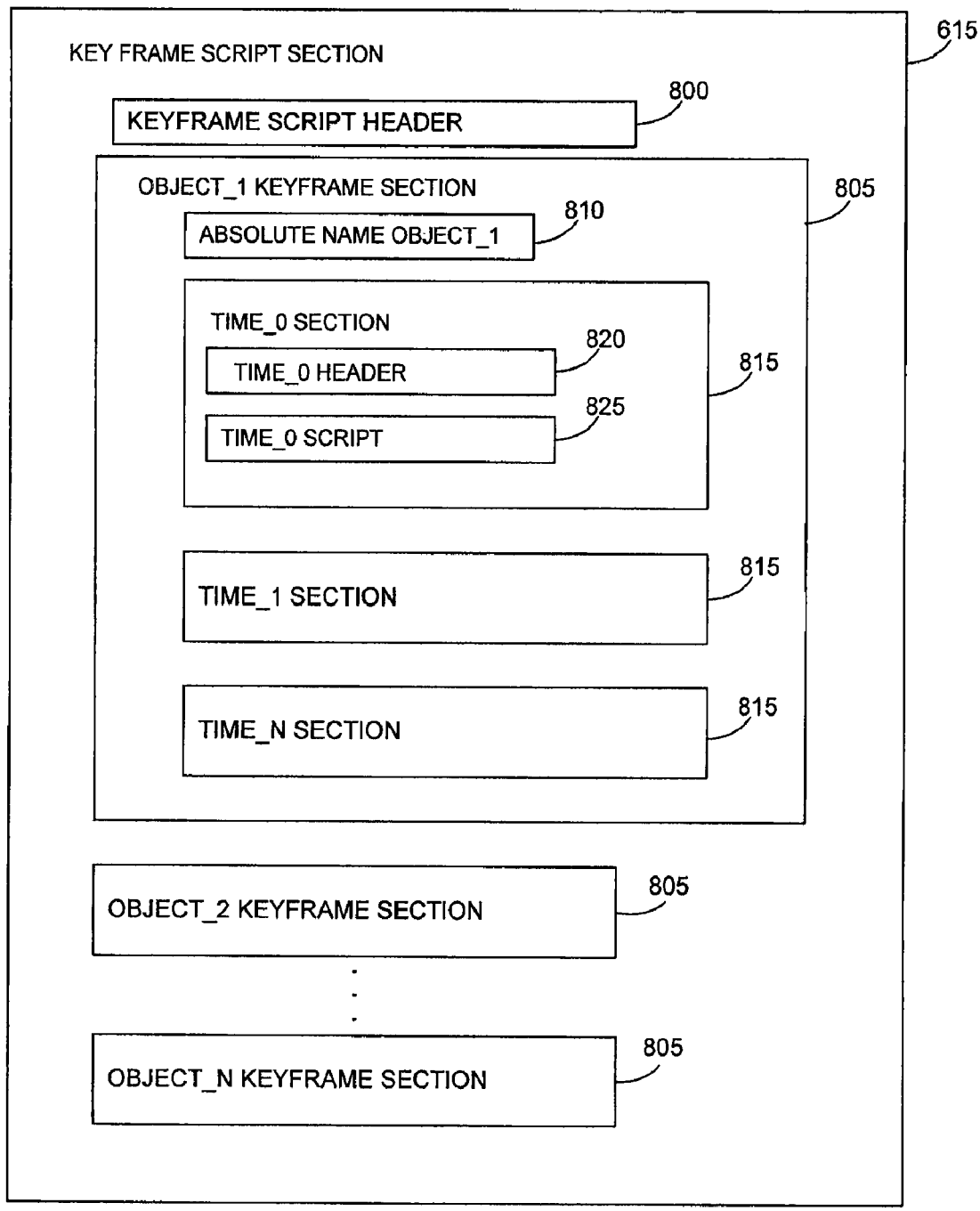
FIG. 8 is an example illustrating the organization of a keyframe script section.

FIG. 8 illustrates the organization of an exemplary keyframe script section 615 (FIG. 6). Keyframe scripts are associated with a specific frame in the timeline associated with the object. The keyframe script section 615 includes a keyframe script header 800. The keyframe script header 800 can be a text string that identifies the section as a keyframe script section. The keyframe script section also includes separate keyframe sections 805 for each object in the hierarchy. The object keyframe sections 805, can include an identifier of the object 810 associated with the scripts in that section. The identifier of the object 810 can be a name that can be used to uniquely identify the object in the hierarchical arrangement of objects. The object keyframe sections 805 can also include one or more time sections 815. Each time section 815 for an object can include a time header 820, specifying the specific frame in the timeline that is associated with the script, and the corresponding keyframe script 825 to be executed. Scripts associated with different frames in the timeline can be listed in different time sections.

In the exemplary keyframe script section illustrated in FIG. 8, the keyframe script header 800 is followed by an object keyframe section for OBJECT_1 805. The object keyframe section for OBJECT_1 805 includes an absolute name for OBJECT_1, followed by time sections for each frame having an associated keyframe script in the timeline for OBJECT_1. In the example, the time section 815 for TIME_0 includes a time header for TIME_0 820 and the script 825 that is executed when TIME_0 is reached. The time section for TIME_0 is followed by time sections for other keyframe scripts associated with OBJECT_1. The object keyframe section for OBJECT_1 is followed by object keyframe sections for other objects in the hierarchy.

Figure 9:
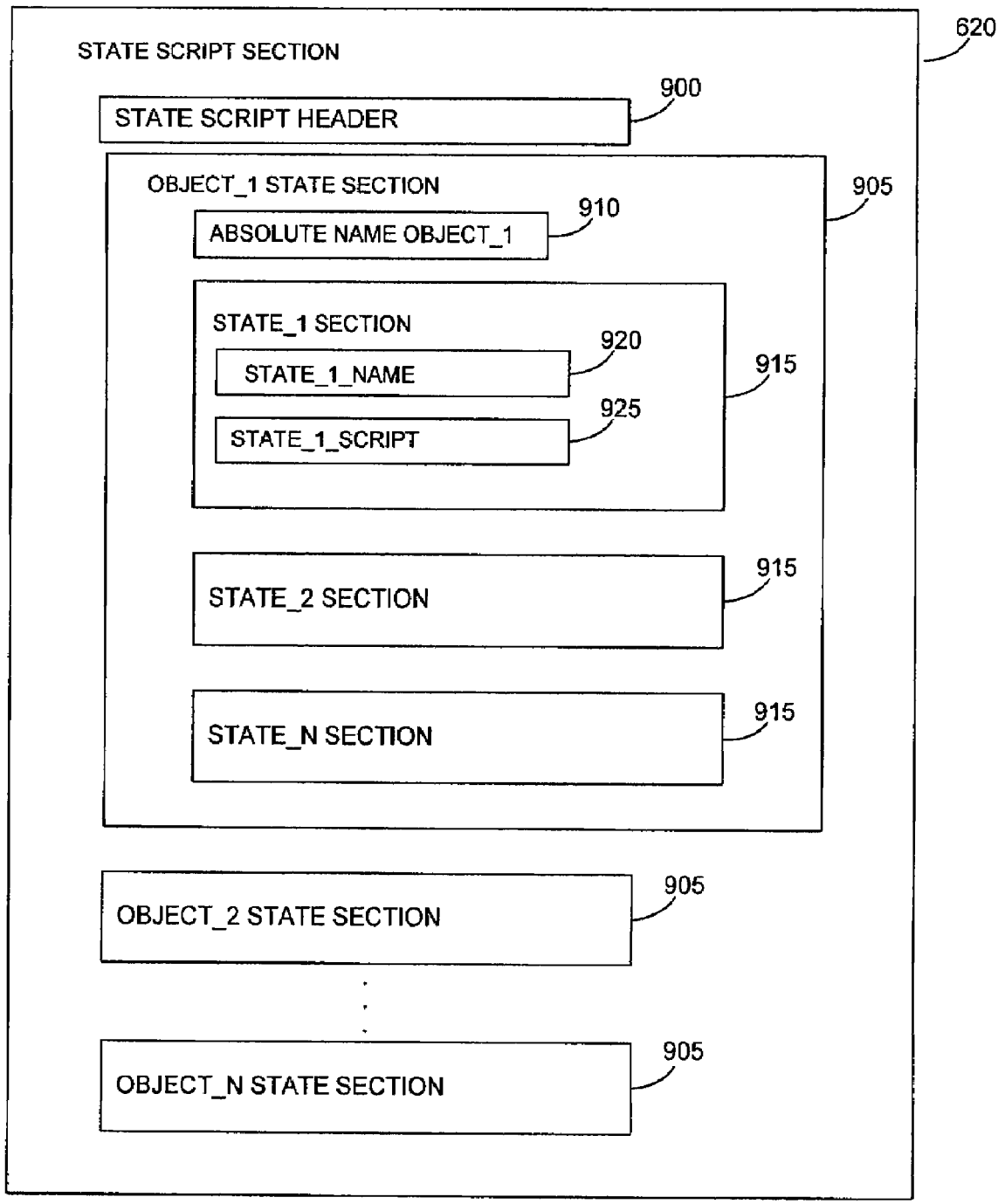
FIG. 9 is an example illustrating the organization of a state script section.

FIG. 9 illustrates the organization of an exemplary state script section 620 (FIG. 6). The state script section 620 includes a state script header 900. The state script header 900, can be a text string that identifies a section as a state script section. The state script section 620 also includes separate object state sections 905 for each object in the hierarchy. The object state sections 905 can include an identifier of the object 910 that is associated with the state scripts in that section. The identifier of the object 910 can be a name that can be used to uniquely identify the object in the hierarchy. The object state sections 905 can also include one or more state sections 915. Each state section 915 for an object can include the name of a triggering state 920 and the script 925 associated with the triggering state. Separate state sections 915 can be used to list different state scripts associated with the same object.

In the exemplary state script section illustrated in FIG. 9, the state script header 900 is followed by an object state section for OBJECT_1 905. The state section for OBJECT_1 905 includes an absolute name for OBJECT_1, followed by state sections for each state that triggers the execution of a script. In the example, the state section for STATE_1 includes the name of STATE_1 920, and the script 925 that is triggered when OBJECT_1 is in STATE_1. The state section for STATE_1 is followed by state sections for other triggering states associated with OBJECT_1. The object state section for OBJECT_1 is followed by object state sections for other objects in the hierarchy.

Figure 10:
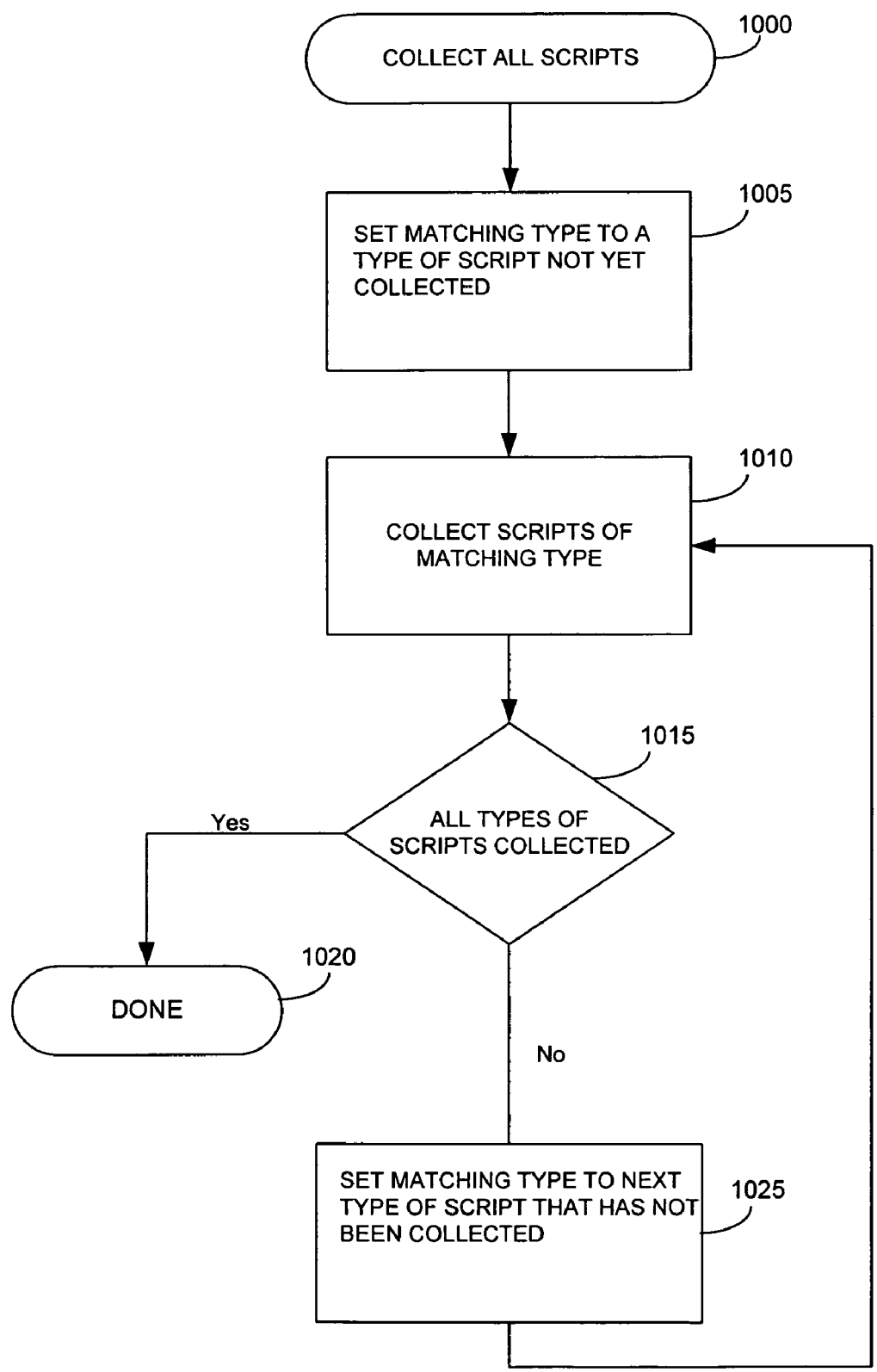
FIG. 10 is a flow diagram illustrating a method of collecting scripts in a distributed scripting environment.

FIG. 10 is a flow diagram illustrating a method of collecting scripts associated with objects in a hierarchical arrangement of objects. The method can be implemented by the operation of the script collection tool 380 (FIG. 3). The script collection tool can collect scripts of all types that are associated with the objects in the hierarchical arrangement of objects. The entry point for the script collection tool is a request to collect all the scripts associated with the objects in a hierarchical arrangement (step 1000). The script collection tool can operate one script type at a time by collecting all the scripts of a particular type before collecting scripts of other types. The scripts are collected one script type at a time by setting a matching script type to be a type of script that has not been collected yet (step 1005). The script collection tool then collects all scripts in the hierarchical arrangement that have the same type as the matching type (step 1010). After all the scripts that are of the same type as the matching type have been collected (step 1010), the script collection tool checks to see if there are any remaining script types that have not been collected (step 1015). If all types of scripts have been collected the script collection for the hierarchical arrangement is complete (step 1020). If all types of scripts have not been collected the matching type is set to the next type of script that needs to be collected and the script collection process is repeated (step 1025).

Figure 11:
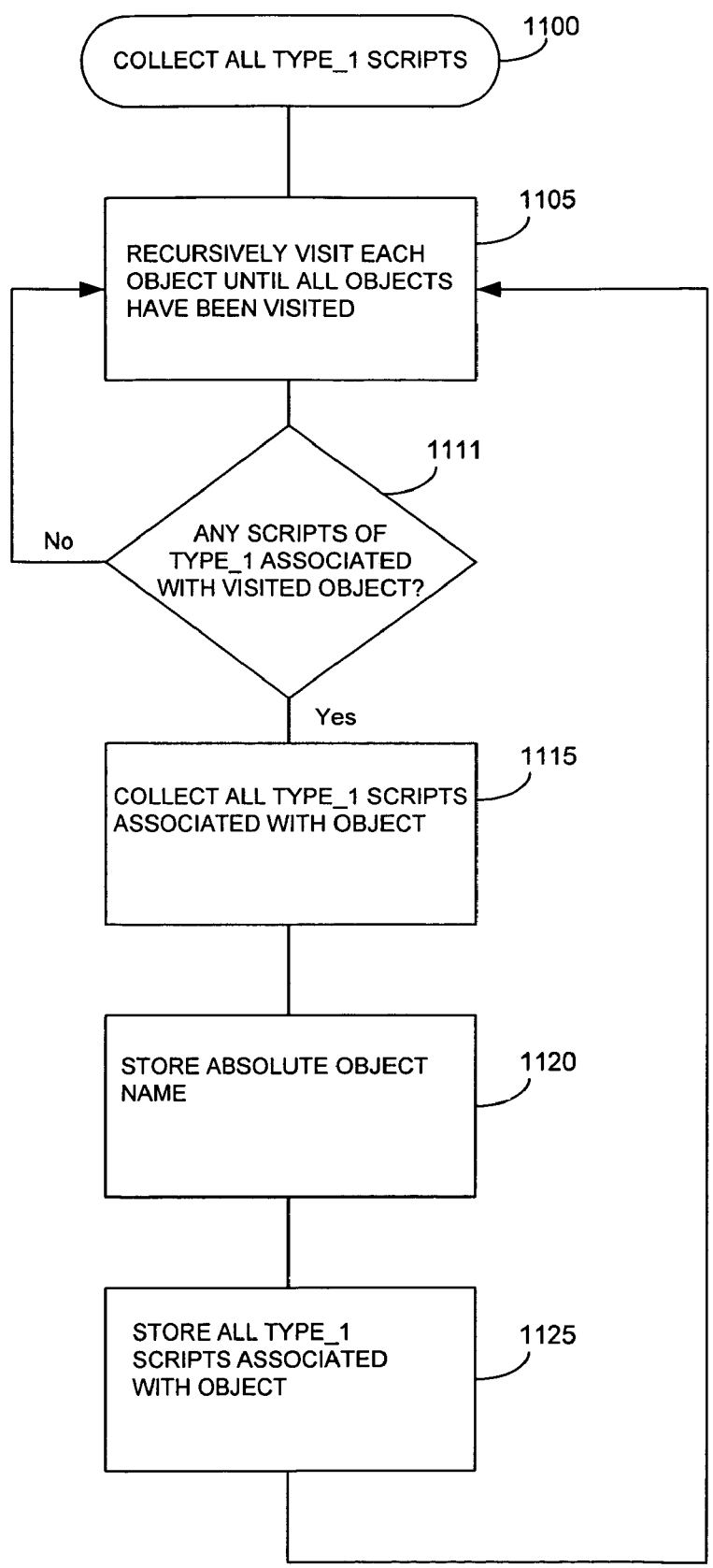
FIG. 11 is a flow diagram illustrating a method of collecting scripts of a specific type.

FIG. 11 is a flow diagram illustrating a method for collecting scripts of a specific matching type in the hierarchical arrangement of objects (step 1110). The method starts when a request to collect the scripts of a matching type is received (step 1100). Each object in the hierarchy is visited by recursively traversing the hierarchical arrangement of objects (step 1105). The scripts associated with each object visited during the recursive traversal are inspected to determine if the visited object has any scripts of the matching type associated with the object (step 1110). If there are no scripts of the matching type associated with the object, control goes back to step 1105 and the next object is visited. If there are scripts of the matching type associated with the object during step 1110, all the scripts of the matching type associated with the object are collected (step 1115). An identifier for the visited object, such as an absolute object name, is derived and stored (step 1120). All scripts of the matching type collected during step 1115 are also stored (step 1125). Following step 1125, control returns to step 1105, and the next object in the hierarchical arrangement is visited.

The script collection tool can also be used to provide a script printing tool by printing the script data structure to a text file. Such a script printing tool can facilitate debugging the scripts by making all the scripts in a distributed scripting environment available in a single text file or an HTML file. The data structure produced by the script collection tool can also be used to provide input to a graphic design tool that operates on the scripts associated with the objects in a graphical composition.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

This invention has been described in terms of particular embodiments. Nevertheless, it will be understood that various modifications may be made without departing from the spirit and scope of the invention. For instance, the steps of the invention can be performed in a different order and still achieve desirable results. Accordingly, other embodiments are within the scope of the following claims.

What is claimed is:

1. A computer implemented method, comprising:

receiving a representation of a graphical composition, the representation of the graphical composition being a hierarchical arrangement of graphics objects in which at least one of the graphics objects includes another one of the graphics objects, the graphical composition comprising elements of text, images, graphics, or a combination thereof, each element represented by one of the graphics objects, where two or more of the graphics objects each have associated properties and behaviors and each can be animated by triggering changes in the associated properties and behaviors based on keyframes, events, or states, and each have one or more associated scripts, each script comprising instructions that can operate on the associated graphics object to animate the associated graphics object in the graphical composition, the scripts including a keyframe script associated with a specific frame in a timeline associated with the graphics object associated with the keyframe script;

traversing the hierarchical arrangement of graphics objects automatically in response to a request to collect scripts associated with the graphics objects in the hierarchical arrangement and, when each graphics object is visited in the traversal, automatically identifying one or more scripts and collecting the one or more identified scripts in a single data structure; and using the single data structure containing all the collected scripts as an input to a graphic design tool.

2. The method of claim 1, wherein:

collecting the scripts includes ordering the scripts within the data structure.

3. The method of claim 2, wherein:

the scripts each execute when triggered by a triggering condition; and ordering the scripts includes grouping the scripts based on the triggering condition that triggers the execution of each respective script.

4. The method of claim 2, wherein:

ordering the scripts includes grouping the scripts based on the graphics object associated with each respective script.

5. The method of claim 1, wherein:

collecting the scripts includes writing the data structure to a text file.

6. The method of claim 1, wherein:

collecting the scripts includes writing the data structure to an HTML file.

7. The method of claim 1, wherein:
the data structure includes a name identifying a file containing the hierarchical arrangement of objects.

8. The method of claim 1, wherein:
each object in the hierarchical arrangement of graphics objects has a unique identifier; and
the data structure includes for each script the unique identifier for the graphics object associated with the respective script.

9. The method of claim 1, wherein:
the data structure includes a time-stamp associated with the script.

10. The method of claim 1, wherein the graphic design tool operates on the scripts associated with the graphical objects in a graphical composition.

11. The computer implemented method of claim 1, wherein first scripts associated with a first graphics object of the two or more graphics objects cannot be accessed at the same time as second scripts associated with a second graphics object of the two or more graphics objects, and each of the first scripts and the second scripts can only be collected while their respective associated graphics object is selected.

12. A computer program product, tangibly embodied in a computer readable storage medium, the computer program product comprising instructions operable to cause data processing equipment to:
receive a representation of a graphical composition, the representation of the graphical composition being a hierarchical arrangement of graphics objects in which at least one of the graphics objects includes another one of the graphics objects, the graphical composition comprising elements of text, images, graphics, or a combination thereof, each element represented by one of the graphics objects, where two or more of the graphics objects each have associated properties and behaviors and each can be animated by triggering changes in the associated properties and behaviors based on keyframes, events, or states and each have one or more associated scripts each script comprising instructions that can operate on the associated graphics object to animate the associated graphics object in the graphical composition, the scripts including a keyframe script associated with a specific frame in a timeline associated with the graphics object associated with the keyframe script;
traverse the hierarchical arrangement of graphics objects automatically in response to a request to collect scripts associated with the graphics objects in the hierarchical arrangement and, when each graphics object is visited in the traversal, automatically identify one or more scripts and collect the one or more identified scripts in a single data structure; and
use the single data structure containing all the collected scripts as an input to a graphic design tool.

13. The computer program product of claim 12, wherein the instructions for
collecting the scripts cause the data processing equipment to:
collect the scripts by ordering the scripts within the data structure.

14. The computer program product of claim 13, wherein:
the scripts each execute when triggered by a triggering condition; and
the instructions for ordering the scripts cause the data processing equipment to group the scripts based on the triggering condition that triggers the execution of each respective script.

15. The computer program product of claim 13, wherein the instructions for ordering the scripts cause the data processing equipment to:
group the scripts based on the graphics object associated with each respective script.

16. The computer program product of claim 12, wherein the instructions for collecting the scripts cause the data processing equipment to:
communicate the data structure by writing the data structure to a text file.

17. The computer program product of claim 12, wherein the instructions for collecting the scripts cause the data processing equipment to:
communicate the data structure by writing the data structure to an HTML file.

18. The computer program product of claim 12, wherein the data structure includes a name identifying a file containing the hierarchical arrangement of objects.

19. The computer program product of claim 12, wherein:
each object in the hierarchical arrangement of graphics objects has a unique identifier; and
the data structure includes for each script the unique identifier for the graphics object associated with the respective script.

20. The computer program product of claim 12, wherein the data structure includes a time-stamp associated with the script.

21. The computer program product of claim 12, wherein first scripts associated with a first graphics object of the two or more graphics objects cannot be accessed at the same time as second scripts associated with a second graphics object of the two or more graphics objects, and each of the first scripts and the second scripts can only be collected while their respective associated graphics object is selected.

22. A system, comprising:
means for receiving a representation of a graphical composition, the representation of the graphical composition being a hierarchical arrangement of graphics objects in which at least one of the graphics objects includes another one of the graphics objects, the graphical composition comprising elements of text, images, graphics, or a combination thereof, each element represented by one of the graphics objects, where two or more of the graphics objects each have associated properties and behaviors and each can be animated by triggering changes in the associated properties and behaviors based on keyframes, events, or states, and each have one or more associated scripts, each script comprising instructions that can operate on the associated graphics object to animate the associated graphics object in the graphical composition, the scripts including a keyframe script associated with a specific frame in a timeline associated with the graphics object associated with the keyframe script;
means for traversing the hierarchical arrangement of graphics objects automatically in response to a request to collect scripts associated with the graphics objects in the hierarchical arrangement and, when each graphics object is visited in the traversal, automatically identifying one or more scripts and collecting the one or more identified scripts in a single data structure; and
means for storing the one or more scripts associated with each identified graphics object in the single data structure.

23. The system of claim 22, further comprising:
means for using the single data structure as an input to a graphic design tool.

24. The system of claim 22, further comprising:
means for receiving user input specifying one or more object types.

25. The system of claim 24, wherein the identified graphics objects are identified as being of the one or more object types.

26. The system of claim 22, further comprising:
means for receiving user input specifying one or more triggering conditions; and means for collecting only those scripts that execute when triggered by the one or more triggering conditions.

27. The system of claim 22, wherein the identified graphics objects are all the graphics objects in the hierarchical arrangement.

* * * * *

UNITED STATES PATENT AND TRADEMARK OFFICE
CERTIFICATE OF CORRECTION

PATENT NO. : 7,385,613 B1
APPLICATION NO. : 10/335216
DATED : June 10, 2008
INVENTOR(S) : Kashmira V. Shukla It is certified that error appears in the above-identified patent and that said Letters Patent is hereby corrected as shown below:

On the Title Page; item (56) - OTHER PUBLICATIONS:
   Right column, line 9:
      delete "Wkipedia", and insert --Wikipedia--

Right column, line 11:
      delete "Wkipedia", and insert --Wikipedia--

Right column, line 13:
      delete "Graphics:principles", and insert --Graphics: Principles--

Right column, line 14:
      delete "Wesly", and insert --Wesley--

Claim 12:
   column 9, line 38:
      insert --,--, after "states"

column 9, line 39:
      insert --,--, after "scripts"

Signed and Sealed this

Thirty-first Day of March, 2009

JOHN DOLL
*Acting Director of the United States Patent and Trademark Office*